United States Patent [19]

Bührer

[11] 4,202,443
[45] May 13, 1980

[54] CONVEYOR BELT CURVE

[75] Inventor: Werner Bührer, Thalwil, Switzerland

[73] Assignee: Transver AG, Wadenswil, Switzerland

[21] Appl. No.: 958,728

[22] Filed: Nov. 8, 1978

[30] Foreign Application Priority Data

Nov. 22, 1977 [CH] Switzerland .................. 14273/77

[51] Int. Cl.$^2$ .................. B65G 15/02; B65G 21/16
[52] U.S. Cl. .................................. 198/831; 198/834
[58] Field of Search .............. 198/831, 833, 834, 838, 198/839, 840

[56] References Cited

U.S. PATENT DOCUMENTS

| 3,358,811 | 12/1967 | Gerrish | 198/831 |
| 3,561,587 | 2/1971 | Schausten | 198/831 |
| 3,951,256 | 4/1976 | Gurewitz | 198/831 |

Primary Examiner—James L. Rowland

[57] ABSTRACT

A conveyor belt curve comprising two rows of rollers for deflecting or turning an endless conveyor belt. The roller rows each consist of a number of cylindrical rolls. The conveyor belt is driven by means of a driven chain through the agency of chain fixed-entrainment members or elements. The chain is guided within guide rails for the upper and lower chain runs, these guide rails determining the curvature of the curved portion of the conveyor belt curve. The entrainment elements contain rolls or rollers rollingly supported at the guide rails. The endless conveyor belt is held in a tensioned state by means of special tension springs. These springs are formed of an elastomeric material and have a preferred loop-shaped configuration.

7 Claims, 3 Drawing Figures

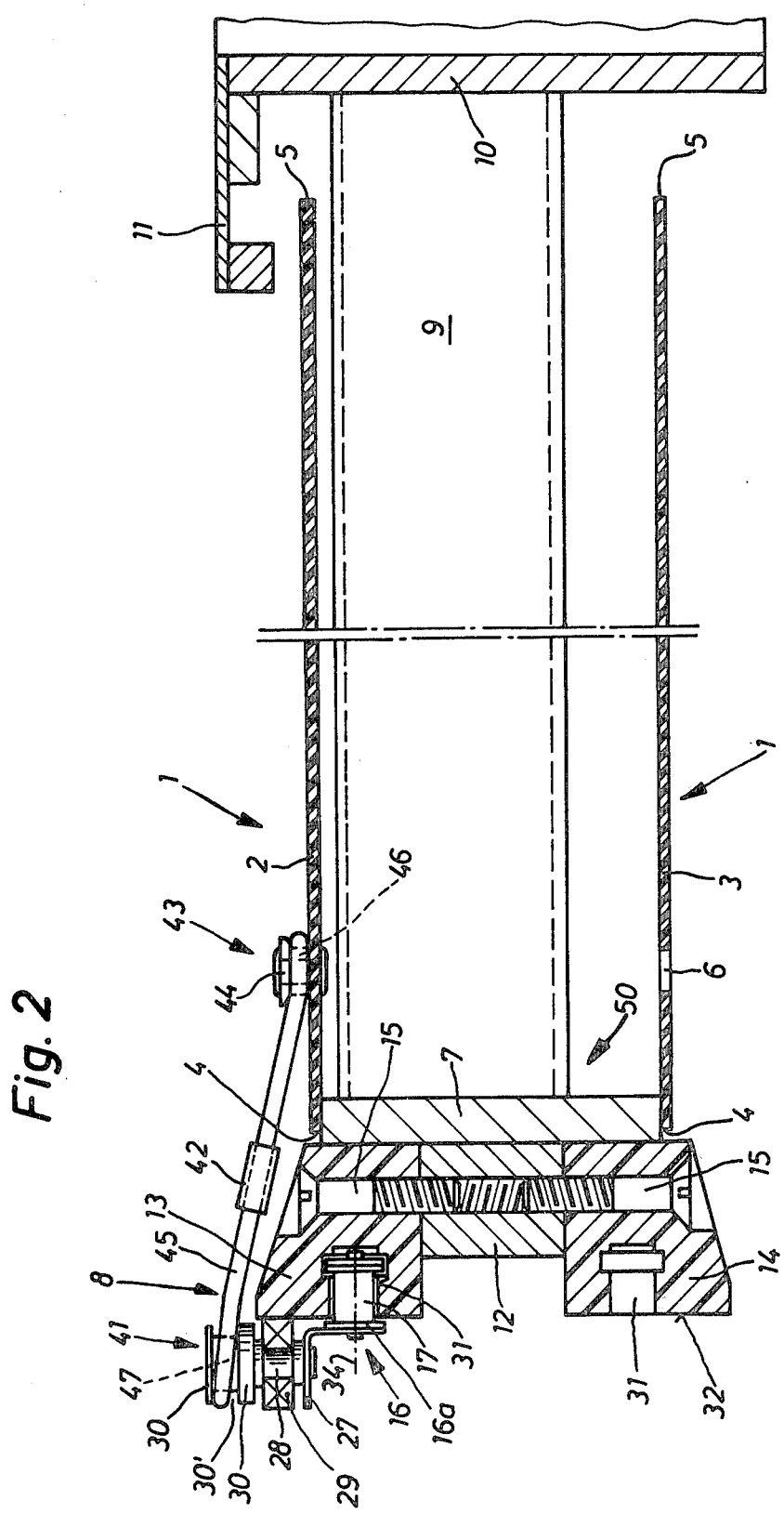

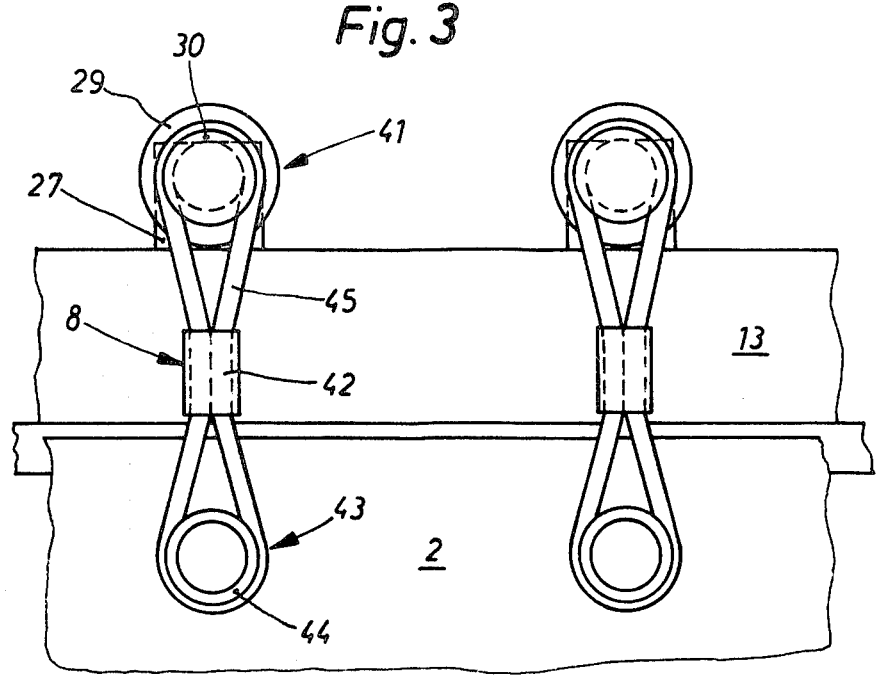

CONVEYOR BELT CURVE

BACKGROUND OF THE INVENTION

The present invention relates to a new and improved construction of conveyor belt curve, in other words, a curved portion or section of a conveyor belt.

The conveyor belt curve is of the type comprising two rows of rollers or rolls for deflecting an endless conveyor belt or band—hereinafter simply referred to as conveyor belt—, these rows of rolls each composed of a number of substantially cylindrical rolls. The conveyor belt is driven by means of a driven chain through the intermediary of chain fixed-entrainment elements. The chain is guided by guide rails for the upper and lower chain runs, these guide rails determining the curvature of the curved portion or section of the conveyor belt arrangement.

Such type of conveyor belt curve or curved portion has already been developed by the assignee of this application and has been found to be extremely useful in practice, since, particularly owing to the use of cylindrical rolls in place of conical rolls, there is achieved an extremely small deflection radius at the radial innermost location of the conveyor belt curve.

SUMMARY OF THE INVENTION

With the foregoing in mind, it is a primary object of the present invention to improve upon this known conveyor belt curve, in order that the conveyor belt also can travel at an extremely high speed or velocity.

A further significant object of the invention aims at the provision of a new and improved construction of conveyor belt curve or curved portion which is relatively simple in design, economical to manufacture, extremely reliable for guiding at high travel speeds a conveyor belt at the curved portion, without malfunction, binding or breakdown of the conveyor belt system, and which requires very little maintenance and servicing.

Now, in order to implement these and still further objects of the invention, which will become more readily apparent as the description proceeds, the inventive conveyor belt curve or curved portion is manifested by the features that the entrainment elements contain rolls or rollers which are rollingly supported at the guide rails, that the chain comprises a multiplicity of chain links disposed in spaced relationship from one another; that each of the chain links having a shaft upon which there is seated a respective roll of the entrainment members, in order to bear by means of its outer surface at one of the guide rails; with a respective elastomeric tension spring provided for each roll of each entrainment member; that said tension spring having opposed ends; and that one end of the tension spring bearing at the shaft carrying the related roll and the other end at the conveyor belt.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a sectional view of the arrangement of FIG. 1, taken substantially along the line II—II thereof; and FIG. 3 is a top plan view of the sectional illustration of FIG. 2.

DETAILED DESCRIPTION OF THE PREFERRED EMBODIMENT

Figure 1:
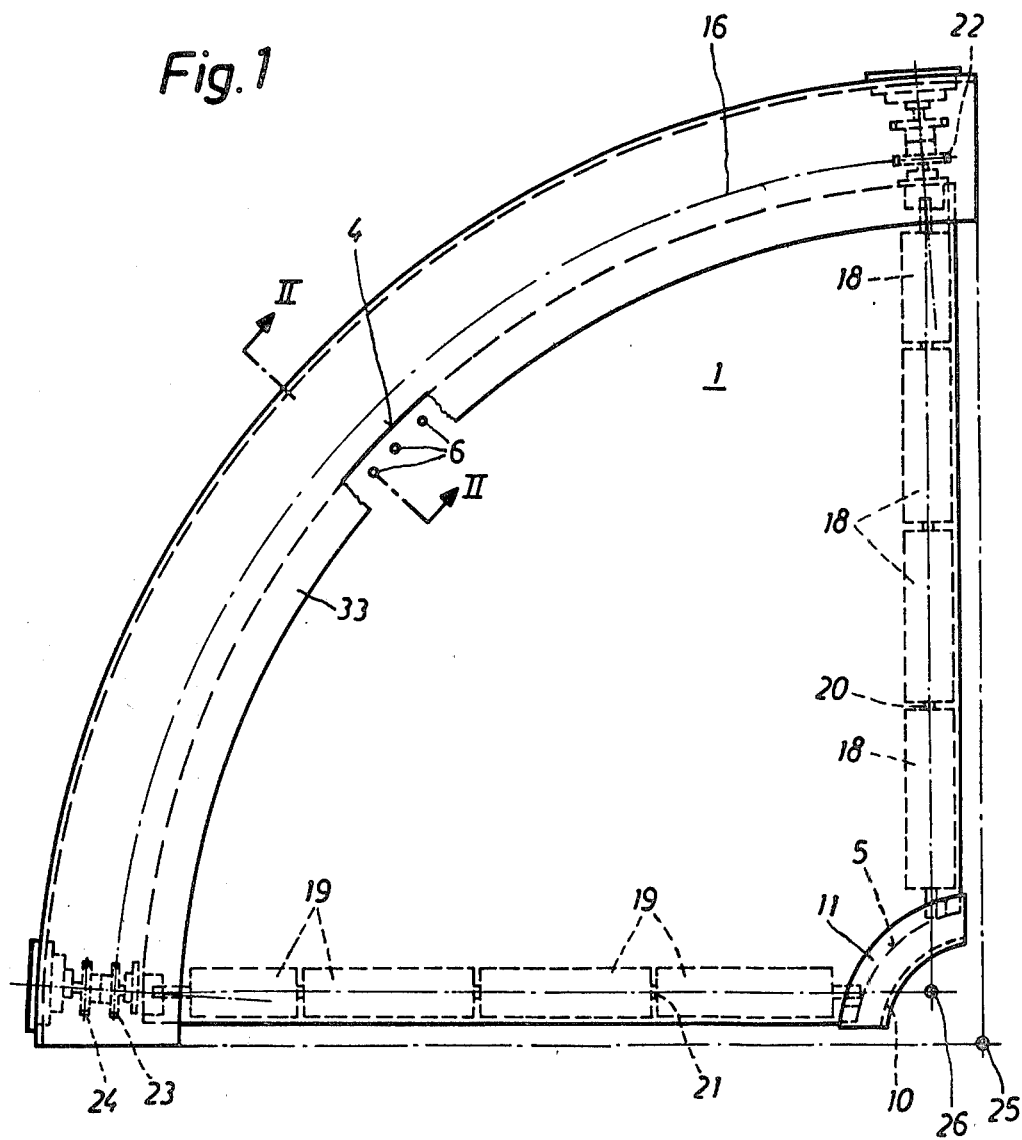
FIG. 1 is a top plan view of a schematic illustration of 90° of a conveyor belt curve or curved portion.

Describing now the drawings, it is to be understood that only enough of the conveyor belt system has been shown in the drawings to enable those skilled in the art to readily understand the underlying principles and concepts of the present invention. Turning now to FIG. 1 there is illustrated therein a 90°-conveyor belt curve or curved portion which comprises an endless conveyor belt or band 1 having an upper run 2 and a lower run 3. The conveyor belt 1 has curved side edges 4 and 5. In development the conveyor belt 1 has a semicircular-shaped section. At the region of the radial outer side edge 4 the conveyor belt 1 is provided with a multiplicity of holes or perforations 6, in FIG. 1 there having only been shown three such holes or perforations. The conveyor belt 1 bears by means of its upper run 2 and its lower run 3 at a frame fixed-ring member or ring element 7 and is held in a tensioned state by means of the tension springs 8. The stationary frame of the conveyor belt 1, which frame has been generally indicated by reference character 50, will be seen to further comprise radial struts 9 and a radial inner shell 10, having a segment-like flange 11. The stationary frame 50, apart from containing the ring element 7, further contains an attachment ring 12 at which there are secured the guide rails 13 and 14 by means of screws or threaded bolts 15 or equivalent fastening expedients. The components 7, 10, 11, 12, 13 and 14 extend essentially through an angle of 90°.

In both guide rails 13 and 14 there travels an endless link chain 16 containing chain links, generally indicated in FIG. 2 by reference character 16a. The upper run 17 of the link chain 16 travels in the guide rail 13 and the not particularly illustrated lower run of the chain 16 then travels in the guide rail 14.

The conveyor band curve or curved portion is provided with two roller rows, wherein the one row of rollers consists of a number of substantially cylindrical rolls or rollers 18. The other row of rollers comprises equally substantially cylindrical rolls or rollers 19. Both rows of rollers 18 and 19 are located at an angle of 90° with respect to one another. The rolls 18 and 19 are preferably formed of a suitable plastic material, having the properties discussed more fully hereinafter, and are seated to be freely rotatable upon the shafts or axles 20 and 21. The rolls 18 and 19 serve for deflecting the conveyor belt 1 and are not driven. In order to drive this conveyor belt 1 there is utilized the chain 16 which travels over the sprocket wheels or gears 22 and 23. Rigidly connected for rotation with the sprocket wheel or gear 23 is a coaxial sprocket gear or wheel 24 which is driven by a chain by means of a not particularly illustrated drive motor of standard construction. The axes of rotation of sprocket wheels or gears 22 to 24 are located at an inclination with respect to the axes of roation of the neighboring rolls 18 and 19, respectively, and meet at a vanishing point 25. On the other hand, the rotational axes of the rolls 18 and 19 intersect at the point 26.

Between the driven chain 16 and the conveyor belt 1 which is to be driven there are provided chain fixed-entrainment elements which are visible in FIG. 2. The already mentioned tension spring 8 constitutes one of such entrainment elements. Apart from such spring 8 there is also provided an angle-shaped bracket 27, a shaft 28 attached thereto, and a roll 29 seated upon shaft 28 as well as a knob 41 for attachment of the spring 8 at the chain 16. The roll 29 can advantageously be designed as a roller bearing, so that there prevails as low as possible friction between the shaft 28 and the roll or roller 29. In order to obtain good sliding properties for the chain 16 both guide rails 13 and 14 are advantageously fabricated from a suitable plastic having as low as possible coefficient of friction. This however is not the only requirement which is placed upon the material from which there are formed the rails 13 and 14. This plastic must, however, also be capable of being loaded compressively in the presence of heat which develops and can not be avoided, in other words, should not alter its shape. In this respect there should be further mentioned that such plastics are particularly good thermal insulators. The heat which arises owing to the friction of the chain 16 in the guide rails 13 and 14 can only be poorly removed. In order to to satisfactorily solve this problem the chain 16 is guided by means of the rolls or rollers 29 at the guide rails 13 and 14.

Continuing, the conveyor belt 1 is retained radially in a tensioned state by means of the springs 8. The force flow for such supporting of the belt 1 proceeds by means of each spring 8, its shaft 28 and the related roll or roller 29, to the frame fixed-guide rails 13 and 14, respectively. Only a small part of this supporting force is occasionally transmitted by means of the bracket 27 and the chain 16 to the rails 13 and 14. The frame fixed supporting or retention of the belt 1 is thus accomplished by rolling of the chain 16, by means of the rolls or rollers 29, at the rails 13 and 14, and no longer by a sliding friction between the chain 16 and the walls of the recesses 31 in the rails 13 and 14 for the chain links 16a of the chain. Thus, now there is replaced a sliding friction at different locations of the recesses 31 by a rolling friction at a flat or planer surface 32 of the rails 13 and 14.

The holes or perforations 6 in the conveyor belt 1 are located at a relatively small, essentially constant spacing from one another. Offset through the same angular degree the links 16a of the chain 16 are also provided with a respective angle member 27 and shaft 28 for the related roll 29 and spring 8.

During its travel the chain 16 follows a circular path, namely the path shown in FIG. 1 from the sprocket wheel or gear 23 to the sprocket wheel or gear 22 and back again, and therefore, is laterally curved. There are available on the market special chains which allow such chain course of travel.

Now in FIG. 1 there is also shown in top plan view a cover flange 33 which, similar to the cover flange 11, covers part of the conveyor belt 1 and determines the useful width of such conveyor belt. The upper cover flanges 11 and 33, in the first instance, serve the purpose of laterally limiting, along its conveying path, the material to be conveyed, so that, for instance, the conveyed material, for instance chocolate, typically pralines, does not come into contact with the springs 8.

With the illustrated exemplary embodiment the pivot axes or axles 34 of the chain links 16a are disposed essentially at right angles to the rotational axes of the rolls 29, in other words, also at right angles to the lengthwise axes of the shafts 28.

According to another embodiment the angle member 27 however could be flexed through an angle greater than 90° and the end surface 32 of the rails 13 and 14 extend at right angles to the lengthwise extent of the spring 8, so that then the lengthwise extent of the spring 8 and the rotational axis of the rolls 29 come to lie at right angles with regard to one another.

Due to the rolling and no longer any sliding support of the conveyor belt 1 at the frame fixed-arcuate-shaped or circular-shaped curved guide rails 13 and 14 there is produced less frictional heat. Furthermore, due to the tensioned supporting or mounting of the conveyor belt or band 1 the supporting force is shifted to the end surface 32 of the rails 13 and 14, in order words, this supporting force no longer bears at the relatively small surfaces in the recesses or grooves 31. Should it ever be necessary, it is possible to then coat or otherwise treat, in a most simple manner, the surfaces 32 of the rails 13 and 14 such that the rolls or rollers 29 do not, with time, work into the plastic material, in other words, erode or pit away the same. By means of the explained supporting action, i.e., mounting of the conveyor belt 1, it is possible for the chain 16 to be driven at higher speeds, for instance, at a velocity of 120 m/min.

The conveyor belt 1 is held in a tensioned state by means of elastomeric tension springs 8. In FIG. 2 is only shown how the upper run 2 is held in its tensioned state.

The tension spring 8 is designed as a ring 45 formed of an elastomeric material, this ring in its lengthwise extended state, being secured at one end at the shaft 28 and at the other end at the conveyor belt run 2, as by being suspended therein. This lengthwise extended ring 45, which thus is configured into a loop, is surrounded at its intermediate or central region by a sleeve 42, so that the thus configured tension spring has the shape of a figure "8" as best seen by referring to FIG. 3. In order to form the tension spring 8 the ring 45 is thus simply pressed together and introduced into the sleeve 42, whereafter the sleeve 42 is pushed up to the center of the formed loop. To attach this tension spring 8 at the conveyor belt 1 there is provided a knob 43 or equivalent structure which is secured in a throughpassage or cutaway portion of the conveyor belt 1, and thus, protrudes out of the plane of the conveyor belt, i.e., out of the plane of the relevant run 2 or 3, as the case may be. This knob or stud 43 will be seen to have a neck portion or neck 46 and a collar 44 which is larger in diameter. With the tension spring 8 suspended or otherwise connected, the collar 44 engages behind such tension spring. In order to attach the other end of the spring there is provided the knob or stud 41 which protrudes axially from the shaft 28. This knob 41 has two collars 30 or equivalent structure. The axial inner collar 30 is located in confronting relationship to the inner race of the ball bearing 29, and the axial outer collar 30 engages behind the suspended spring 8 which wraps around a neck portion 47 of the knob 41. In order to support the spring 8 at the shaft 28 it is also possible to state that, the shaft 28 is provided with a transverse groove or slot 30′, wherein the loop 45 is engaged by the groove edges or end portions 30. The aforementioned transverse groove 30′ is then formed by the reduced diameter between the groove edges 30 and the neck portion 47. From the last-mentioned different definition of the supporting of the spring at the shaft 28, it will be recognized that also a different, non-illustrated mode of support for the spring 8 at the shaft 28 can be selected. The same is of course also true for the supporting of the other spring end at the conveyor belt 1.

From the showing of FIG. 3 it will be apparent that these springs 8 have a configuration, as the same is known from coat fasteners or closures, wherein such can be designated as trimming fasteners (braid fasteners, Brandenburger).

The elastomeric tension springs 8 are extremely inexpensive to fabricate, since they, of course, are constructed from a ring or closed loop 45 and a sleeve 42. Such rings can be produced at the present time inexpensively. The same is naturally also the case for the sleeve 42, which advantageously can be fabricated from a somewhat elastic plastic, and the sleeve simply can be formed as a section of a hose. Each tension spring 8 is thus moved in conjunction with the conveyor belt in relation to the stationary guide rail 13, so that the sleeve 42 can readily contact now and again the guide rail 13 and slide somewhat thereon. The guide rail 13 likewise is fabricated from a plastic having as low as possible coefficient of friction in relation to the therein guided chain 16 and also with respect to the sleeve 42. The use of the elastomeric tension springs 8 furthermore allows for low-noise operation of the conveyor belt curve or curved portion. Both of the loop-shaped ends of the tension spring 8 are flat, and the plane extending through the tension spring does not have any great spacing with respect to the guide rail 13, wherefore there does not exist any large lever arm to the support location of the roll 29 at the guide rail 13, so that also the bending moment, which has been produced by such lever arm, is not large.

While there is shown and described a preferred embodiment of the invention, it is to be distinctly understood that the invention is not limited thereto, but may be otherwise variously embodied and practiced within the scope of the following claims. ACCORDINGLY,

What is claimed is:

1. A conveyor belt-curved portion comprising:
   an endless conveyor belt;
   two rows of rolls for deflecting said endless conveyor belt;
   each row of rolls comprising a plurality of substantially cylindrical rolls;
   drive means embodying a driven chain equipped with entrainment members fixed at the chain for driving said conveyor belt;
   said driven chain having an upper chain run and a lower chain run;
   guide rails for guiding the upper and lower chain runs of the chain therein;
   said guide rails determining the curvature of the curved portion of the conveyor belt; and
   said entrainment members containing rolls rollingly supported at the guide rails;
   the chain comprises a multiplicity of chain links disposed in spaced relationship from one another;
   each of the chain links having a shaft upon which there is seated a respective roll of the entrainment members, in order to bear by means of its outer surface at one of the guide rails;
   a respective elastomeric tension spring provided for each roll of each entrainment member;
   said tension spring having opposed ends;
   one end of the tension spring bearing at the shaft carrying the related roll and the other end at the conveyor belt.

2. The conveyor belt-curved portion as defined in claim 1, wherein:
   said elastomeric tension spring has a substantially loop-shaped configuration.

3. The conveyor belt-curved portion as defined in claim 2, wherein:
   said shaft is provided with a transverse groove having groove edges;
   said groove edges engaging behind the loop in order to support the loop at the shaft.

4. The conveyor belt-curved portion as defined in claim 2, wherein:
   the conveyor belt is provided along its marginal region with knob means protruding from the plane of the conveyor belt and serving to receive a respective loop end.

5. The conveyor belt-curved portion as defined in claim 2, wherein:
   said shaft is provided with an axially protruding knob means for the reception of a loop end.

6. The conveyor belt-curved portion as defined in claim 2, further including:
   a sleeve for surrounding the loop at is central region in order to form a figure "8".

7. The conveyor belt-curved portion as defined in claim 1, wherein:
   said elastomeric tension spring comprises a ring formed of elastomeric material;
   said ring in its lengthwise extended state being suspended at one end at the shaft and at the other end at the conveyor belt.

* * * * *